Figure 1:
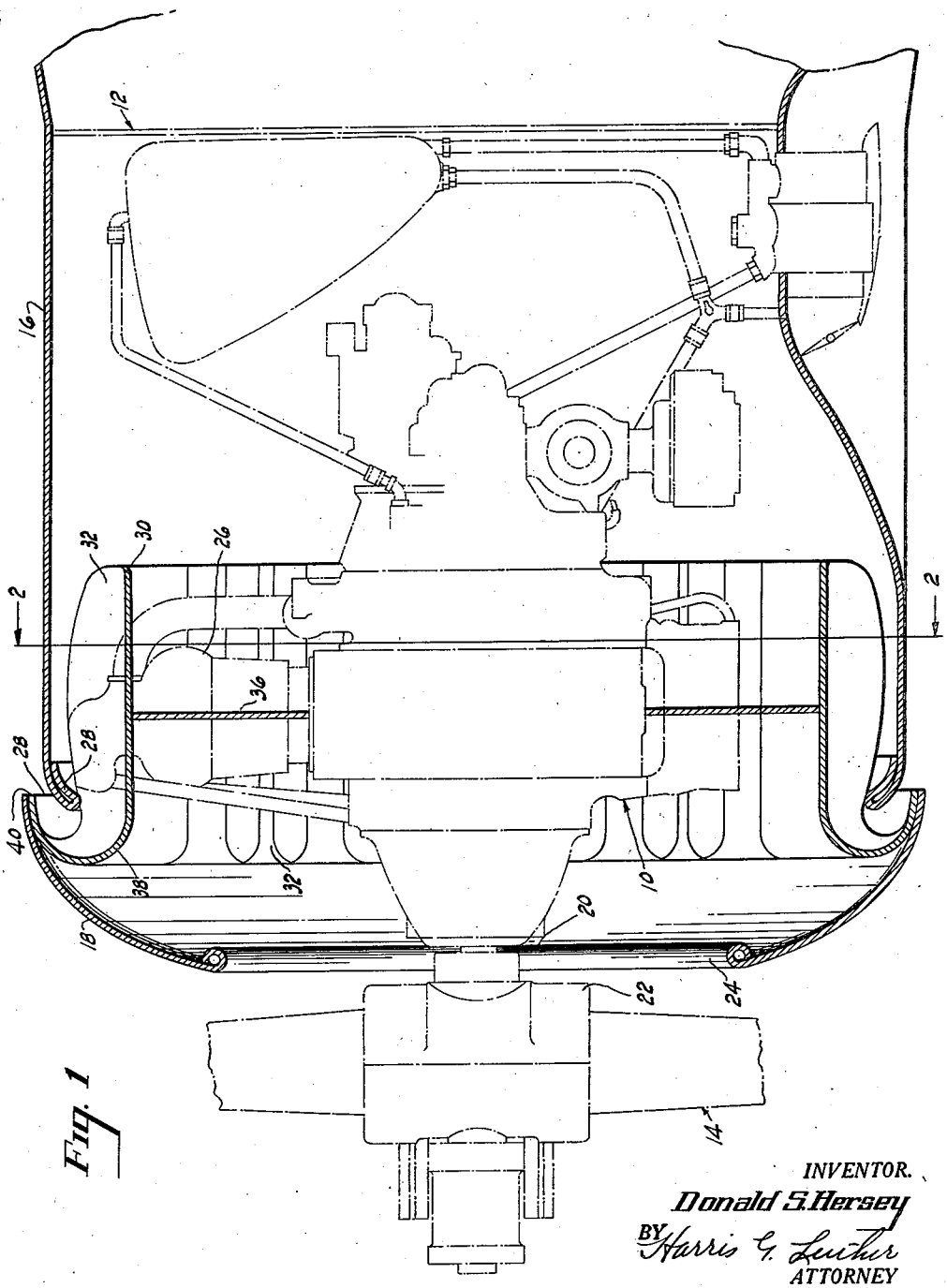

Sept. 5, 1939.  D. S. HERSEY  2,172,139
ENGINE COOLING MEANS
Filed Oct. 31, 1936  2 Sheets-Sheet 2

INVENTOR.
Donald S. Hersey
BY Harris G. Luther
ATTORNEY

Patented Sept. 5, 1939

2,172,139

UNITED STATES PATENT OFFICE

2,172,139

ENGINE COOLING MEANS

Donald S. Hersey, West Hartford, Conn., assignor to United Aircraft Corporation, East Hartford, Conn., a corporation of Delaware Application October 31, 1936, Serial No. 108,581

2 Claims. (Cl. 123—171)

This invention relates to improvements in engine cooling means and has particular reference to improved means for cooling an air-cooled engine, such as a radial internal combustion engine ordinarily employed for the propulsion of aircraft.

An object of the invention resides in the provision of improved means of the character set forth for cooling an engine, such as an air-cooled internal combustion engine and at the same time reducing the resistance of the engine to movement through the air when the engine is used for the propulsion of an aircraft.

A further object resides in the provision of improved means for cooling a propeller driving engine, such means being effective to cool the engine when the air stream past the engine is at its minimum velocity, for instance, as when the engine is mounted upon an airplane and the airplane is standing or taxiing upon the ground.

Other objects and advantages will be more particularly pointed out hereinafter or will become apparent as the description proceeds.

In the accompanying drawings, in which like reference numerals are used to designate similar parts throughout, there is illustrated a suitable mechanical embodiment of what is now considered to be the preferred form of the idea of the invention. The drawings, however, are for the purpose of illustration only and are not to be taken as limiting the invention, the scope of which is to be measured entirely by the scope of the appended claims.

Figure 2:
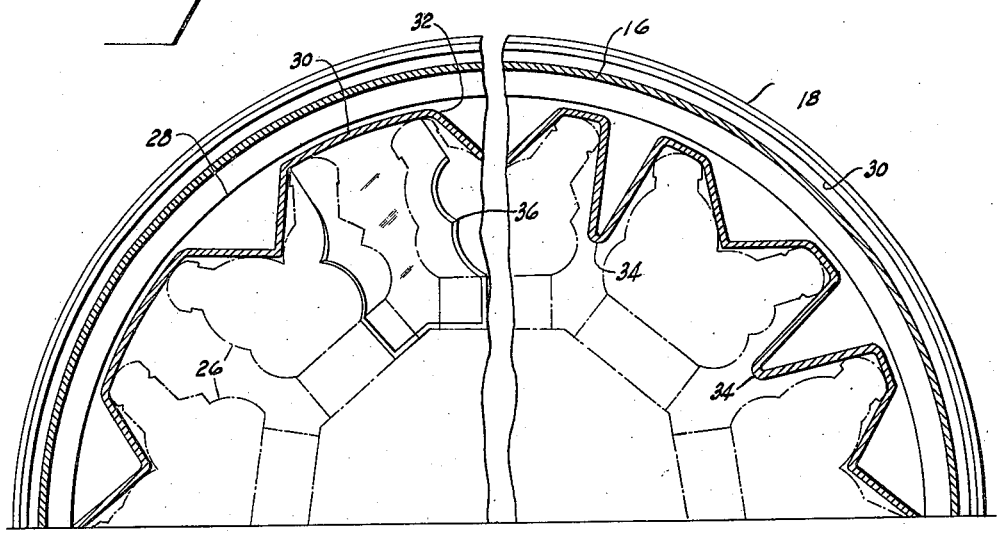

In the drawings, Figure 1 is a vertical sectional view through the cowling surrounding an air-cooled engine of the character described, the engine and a fragmentary portion of the propeller driven thereby being shown in elevation. Figure 2 is a partly schematic sectional view on the line 2—2 of Figure 1 looking in the direction of the arrows.

In the drawings, the numeral 10 generally indicates an air-cooled radial internal combustion engine of the type commonly employed for the propulsion of aircraft. It is to be understood, however, that the invention is not limited in its scope to the exact type of engine illustrated in the drawing and described hereinafter but may be applied to various forms of air-cooled power plants.

The engine 10 is mounted upon the forward end of the fuselage or nacelle 12 by suitable mounting means, not illustrated, and drives an aeronautical propeller generally indicated at 14.

The engine is surrounded by a drag reducing cowl 16 having a front end portion 18 curved inwardly to provide a favorable shape for the entering end of the cowl.

Surrounding the propeller driving shaft 20 and a portion of the propeller hub 22, the forward end 18 of the cowl is provided with an air entrance opening, as indicated at 24 through which cooling air may flow to the engine cylinders 26.

In certain well-known forms of drag reducing cowls, the air entering through the opening 24 flows past the engine cylinders 26 and exits from the cowl through a gill opening between the controlling edge of the cowl and the forward end of the fuselage or nacelle 12. According to the present invention, however, the forward end portion 18 of the cowl is separated from the main portion 16 thereof and an air exit opening 28 is provided between the two portions of the cowl adjacent to the front end of the cowl.

This construction has particular advantages over the usual form in which the air is vented at the rear end of the cowl. It has been found from an analytic study of the air pressure exerted upon the exterior surface of a cowl that an area of relatively low pressure exists near the forward end of the cowl just over the cowl nose, which area of low pressure may be depended upon to assist in venting air from the interior of the cowl. It has also been discovered that the portions of the propeller blades adjacent to the hub 22 or opposite the air entrance opening 24 are relatively inefficient and that when the propeller is rotating at an appreciable speed, the windage of the hub interfers with the air entering the opening 24. However, at a point on the propeller blades removed from their axis of rotation by an amount approximately equal to the radius of the cowl, it has been found that the blade shape is relatively efficient to direct a stream of air backwardly toward the cowl. Thus, although the propeller blades are relatively ineffective to force any air through the opening 24, they are effective to direct a slip stream at high velocity over the exterior surface of the cowl adjacent to the front end or cowl nose. It is the purpose of this invention to take advantage of the two factors noted above to materially improve the cooling of a cowled engine.

As particularly illustrated in Figure 1, the rear edge of the forward portion 18 of the cowl has a diameter materially greater than the forward edge of the main cowl portion 16. Thus the nose portion of the cowl overlies the remainder and provides a rearwardly directed annular vent opening between the rear edge of the forward portion of the cowl and the forward edge of the main portion of the cowl. Preferably the forward edge of the main cowl portion 16 is curved inwardly and beaded over, as indicated at 28, to provide a favorable form for the flow of air past the forward edge of the cowl portion 16 and out through the annular opening 28.

The main cowl portion 16 is formed with a diameter somewhat greater than the internal diameter of the engine 10 and an annular air guide 30 is disposed between the engine and the interior of the cowl. This guide is provided with trough-like depressions 32 which extend downwardly between the rocker boxes of the cylinders, and may be provided with other trough-like depressions 34, which extend downwardly between adjacent cylinders. These depressions provide air channels over the engine between the cowl and the air guide 30. Within the air guide, the engine is provided with pressure baffles 36 which may be of the character described in Patent No. 2,031,541 of A. L. MacClain issued February 18, 1936. These baffles, as set forth in the patent referred to above, are effective to restrict the flow of air through the engine substantially to the spaces between the cooling fins provided upon the engine cylinders to thereby force the air into direct contact with the engine cooling surfaces to carry away the excess engine heat.

The annular air guide 30 surrounds the engine 10 and extends from a location somewhat rearward of the engine cylinders to a location in front of the cylinders and at its front edge is provided with an upwardly curved portion 38 which connects with the rear edge of the forward cowl portion 18, as indicated at 40.

From this description, it will be observed that air entering opening 24 will flow rearwardly of the engine through the spaces between the baffle members 36 and the respective cylinders and at the rear of the engine will flow upwardly past the rear edge of the air guide 30 and then forwardly through space between the guide and the cowl member 16 and out through the annular air exit opening 28.

As explained above, the air exit opening 28 is rearwardly directed and is disposed at a location of substantial maximum diameter of the cowl. Thus the air vent is located in the region of lowest pressure over the exterior surface of the cowl and is also located in such a position that the slip stream from the propeller 14 will flow past the rearwardly directed opening at substantial velocity, even though the aircraft upon which the engine is mounted is on the ground. These two factors will impose an induction effect upon the space immediately rearward of the vent opening and will tend to draw air out through the opening at a high rate of airflow. By increasing the rate of flow of the air leaving the cowl through the vent opening 28, the air pressure in the space within the cowl at the rear of the baffles 36 is materially reduced. Reduction of the air pressure in the space to the rear of the baffles 36 provides an increased pressure differential upon opposite sides of the baffles, thereby increasing the rate of airflow through the spaces between the baffles and the respective cylinders to more effectively carry away the excess heat of the engine. Since with the arrangement illustrated, the air pressure differential upon opposite sides of the baffles can be maintained at a sufficiently high value to properly cool the engine, it has been found unnecessary to alter the inlet opening 24 for the reason that the same amount of cooling can be accomplished with a smaller quantity of air flowing at high velocity and at the same time, the reduction in pressure tends to draw in a sufficient amount of air through the inlet opening, although the opening is small and obstructed by the propeller hub.

With the arrangement illustrated in the drawings and described above, it has been found entirely practical to adequately cool an engine of the character described even when the aircraft upon which the engine is mounted is standing still or moving upon the ground at a relatively slow speed. It has been found that cooling of the engine when operating at substantially full power at slow aircraft speed as when the aircraft is in a steep climb, it is also adequately accomplished by the arrangement described. While there has been illustrated and described a suitable mechanical embodiment of what is now considered to be the preferred form of the idea of the invention, it is to be understood that the invention is not limited to the particular embodiment so illustrated and described, but that such changes in the size, shape and arrangement of parts may be resorted to as come within the scope of the appended claims.

Having now described the invention so that others skilled in the art may clearly understand the same, what it is desired to secure by Letters Patent is as follows.

What is claimed is:

1. In combination with a radial air-cooled internal combustion engine having a plurality of cylinders arranged in one or more rows about a central crankcase and a streamline cowl enclosure for said engine, means for cooling said engine comprising, a centrally located air entrance opening in the forward end of said cowl for admitting a stream of engine cooling air past the heat exchanging surfaces of said cylinders to the space at the rear of said engine from said air entrance opening, an annular air vent opening in said cowl located intermediate the length thereof and immediately forwardly of said cylinders, and means for guiding air from the space at the rear of said engine to said air vent opening comprising, an annular shield surrounding said engine between said engine and said cowl and having depressed portions lying between the rocker boxes of the respective engine cylinders to constitute trough-like ducts for guiding the air from said space at the rear of said engine to said annular air vent opening.

2. In combination with a radial air-cooled internal combustion engine having a plurality of cylinders arranged in one or more rows about a central crankcase and provided with heat exchanging surfaces and a streamlined cowl enclosure for said engine, means for cooling said engine comprising, a centrally located air entrance opening in the forward end of said cowl to admit a stream of engine cooling air past the heat exchanging surfaces of said engine cylinders to the space at the rear of the engine from said air entrance opening, an annular air vent opening in said cowl located intermediate the length thereof and immediately forward of said cylinders, and means for guiding air from the space at the rear of said cylinders to said annular air vent opening comprising, an annular shield member surrounding said engine between said engine and said cowl and provided with depressed portions lying between the rocker boxes of respective cylinders and with depressed portions lying between adjacent cylinders to provide trough-like ducts for guiding air from said space at the rear of the cylinders to said annular air vent opening.

DONALD S. HERSEY.